(12) United States Patent
Christoph et al.

(10) Patent No.: US 9,194,413 B2
(45) Date of Patent: Nov. 24, 2015

(54) FIXING DEVICE AND METHOD FOR FIXING IN AN OPENING IN A WALL

(75) Inventors: Markus Christoph, Regensburg (DE); Michael Kaupp, Horb (DE); Roland Seitz, Nehren (DE); Richard Baur, Pfaffenhofen (DE); Georg Mascha, Radolfzell (DE); Markus Breitenberger, Neufahrn (DE); Dag-Olof Kardell, Mjolby (SE); Boris Adam, Gaeufelden (DE); Thomas Klierl, Neuburg (DE); Rolf Bechtle, Bietigheim-Bissingen (DE); Frank Ocker, München (DE); Adam Balogh, Budapest (HU); Christian Plankl, Regensburg (DE); Werner Menzel, Peine (DE)

(73) Assignee: Robert Bosch GmbH, Stuttgart (DE)

( * ) Notice: Subject to any disclaimer, the term of this patent is extended or adjusted under 35 U.S.C. 154(b) by 655 days.

(21) Appl. No.: 13/120,200

(22) PCT Filed: Aug. 28, 2009

(86) PCT No.: PCT/EP2009/061144
§ 371 (c)(1),
(2), (4) Date: Sep. 20, 2011

(87) PCT Pub. No.: WO2010/031676
PCT Pub. Date: Mar. 25, 2010

(65) Prior Publication Data
US 2012/0000291 A1    Jan. 5, 2012

(30) Foreign Application Priority Data

Sep. 22, 2008 (DE) .......................... 10 2008 048 318

(51) Int. Cl.
*B25G 3/16* (2006.01)
*F16B 7/20* (2006.01)
(Continued)

(52) U.S. Cl.
CPC ............... *F16B 21/02* (2013.01); *G01D 11/30* (2013.01); *Y10T 29/49947* (2015.01); *Y10T 403/7007* (2015.01)

(58) Field of Classification Search
CPC .................. Y10T 403/7007; Y10T 29/49947; F16B 21/02; G01D 11/30
USPC ............... 403/13, 14, 71, 117, 247, 252, 254, 403/348, 349, 353; 411/349, 549, 553; 296/29; 29/428
See application file for complete search history.

(56) References Cited

U.S. PATENT DOCUMENTS 4,532,672 A * 8/1985 Anderson ...................... 16/86 A
4,983,065 A * 1/1991 Spath ............................ 403/252
(Continued)

FOREIGN PATENT DOCUMENTS

DE    2527404    1/1976
DE    19528474   2/1997
(Continued)

OTHER PUBLICATIONS

International Search Report for Application No. PCT/EP2009/061144 dated Mar. 10, 2010 (8 pages).

*Primary Examiner* — Gregory Binda
*Assistant Examiner* — Nahid Amiri
(74) *Attorney, Agent, or Firm* — Michael Best Friedrich LLP

(57) ABSTRACT

A fixing device (200) for fixing in an opening in a wall of a vehicle includes a support element (210) with at least one support lug (220). The fixing device (200) also includes a retaining element (230) with at least one retaining arm (240) for fixing the fixing device (200) to the wall. To fix the fixing device (200) in relation to the support element (210), the retaining element (230) runs through the support element (210) and can rotate, the support lug (220) being designed to block the rotation of the support element (210).

24 Claims, 5 Drawing Sheets

(51) Int. Cl.
*F16B 21/02* (2006.01)
*G01D 11/30* (2006.01)

(56) References Cited

U.S. PATENT DOCUMENTS

| | | | | |
|---|---|---|---|---|
| 5,094,580 | A * | 3/1992 | Abe | 411/553 |
| 5,626,435 | A * | 5/1997 | Wohlhuter | 403/348 |
| 6,004,065 | A * | 12/1999 | Higdon et al. | 403/384 |
| 6,292,142 | B1 * | 9/2001 | Pittman | 343/700 MS |
| 6,612,795 | B2 * | 9/2003 | Kirchen | 411/508 |
| 6,647,793 | B2 | 11/2003 | Dirmeyer et al. | |
| 6,837,645 | B2 * | 1/2005 | Kanatani et al. | 403/348 |
| 7,207,758 | B2 * | 4/2007 | Leon et al. | 411/45 |
| 7,938,024 | B2 * | 5/2011 | Lee et al. | 73/862.045 |
| 7,984,883 | B2 * | 7/2011 | Li et al. | 248/125.7 |
| 2008/0072515 | A1 | 3/2008 | Huhnerbein | |
| 2010/0140419 | A1 | 6/2010 | Brandt et al. | |
| 2010/0272540 | A1 * | 10/2010 | Bucker et al. | 411/549 |

FOREIGN PATENT DOCUMENTS

| | | |
|---|---|---|
| DE | 19926603 | 11/2000 |
| GB | 1509287 | 5/1978 |
| JP | 6412113 | 1/1989 |
| JP | 5117749 | 5/1993 |
| JP | 6-18706 | 3/1994 |
| JP | 2008189035 | 8/2008 |

* cited by examiner

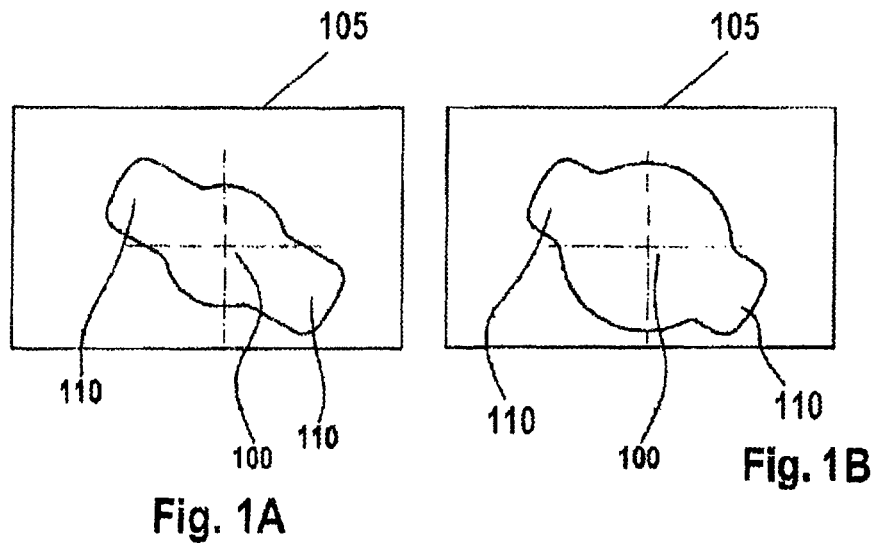
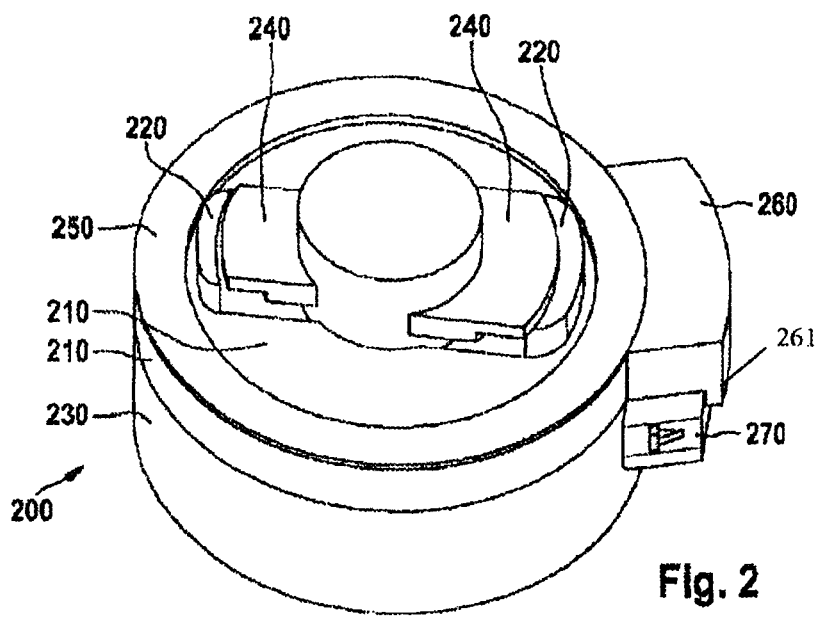

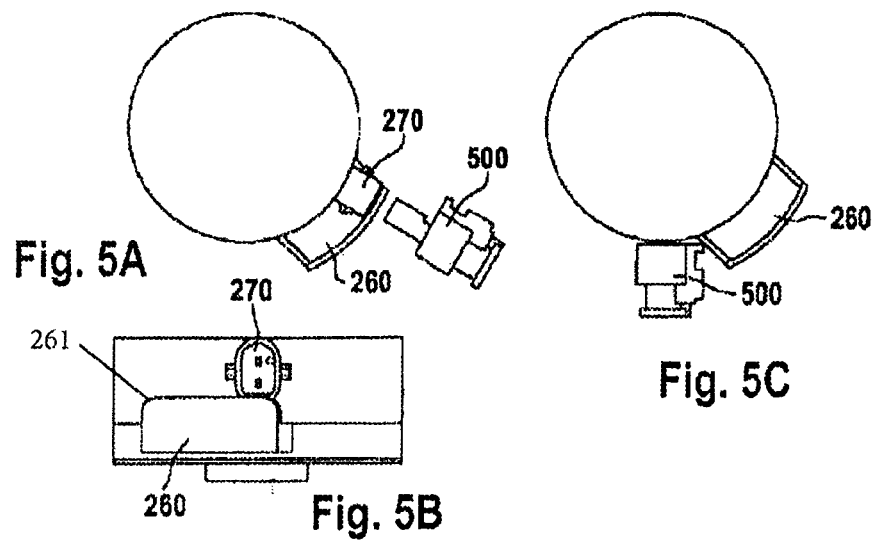
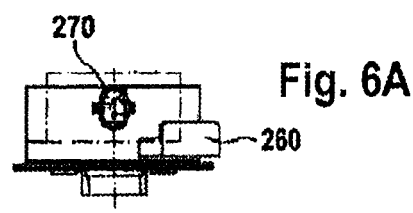
Fig. 5A
Fig. 5B
Fig. 5C
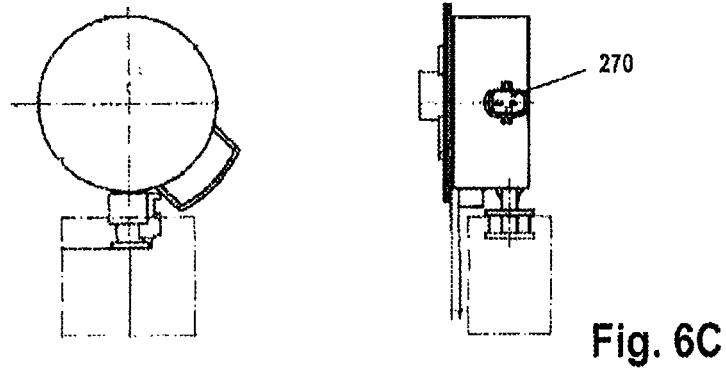
Fig. 6A
Fig. 6B
Fig. 6C

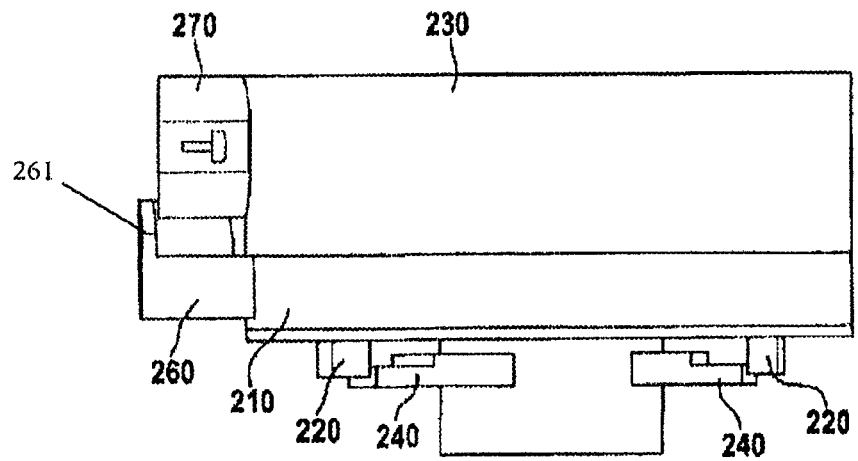
Fig. 7
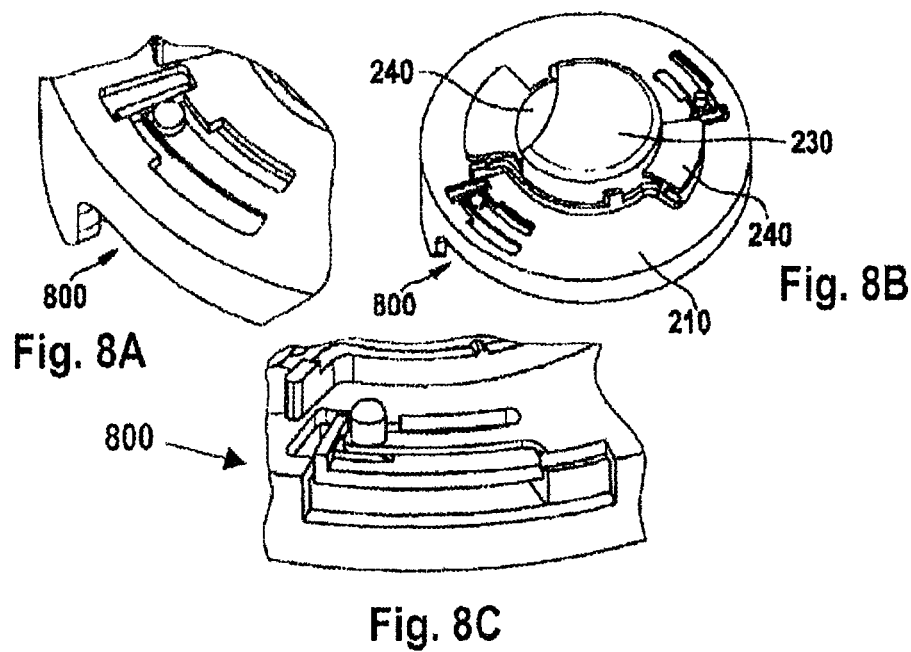
Fig. 8A
Fig. 8B
Fig. 8C

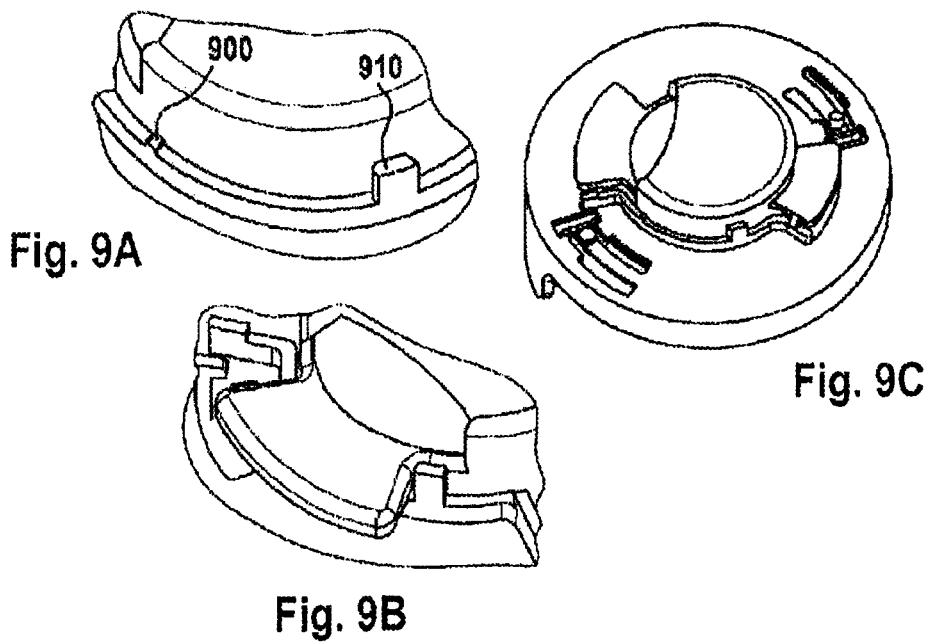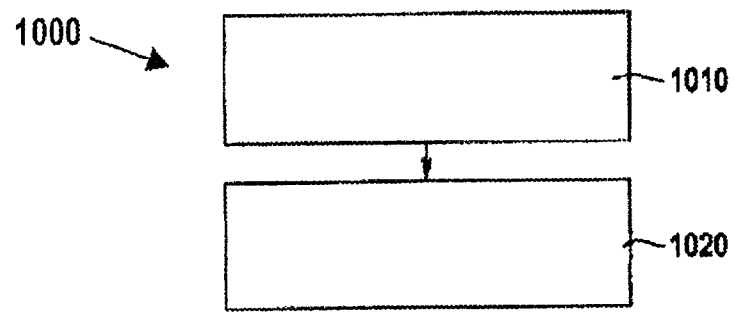

FIXING DEVICE AND METHOD FOR FIXING IN AN OPENING IN A WALL

BACKGROUND OF THE INVENTION

The present invention relates to a fixing device for fixing an element in an opening of a wall, as well as a method for fixing a fixing device to a wall.

In the automobile industry, components, in particular sensors (for example for restraining systems), are fixed in various ways to the vehicle. Typically, fixing methods such as screwing, riveting and bonding are used. Specifically in sensors in applications where safety is critical, such as for example airbag systems, secure mounting is of crucial importance. Firstly, correct mounting has to be ensured when leaving the factory. At the same time, however, the sensor also has to remain securely mounted in the correct location and position or has to be replaceable in a safe manner over the entire service life, in the event of repairs, amongst other things.

Thus in sensors which are available nowadays and which, for example, are fixed by a screw connection, in many cases the mounting is recorded. This may take place, for example, by the torque and rotational angle being monitored and registered during the screwing process.

A sensor module is disclosed in the publication DE 199 23 985 A1, in which the housing of an air pressure sensor, which is used for side impact sensing, is fixed to a wall in the vehicle via fixing means, for example screws.

SUMMARY OF THE INVENTION

The present invention provides a fixing device for fixing in an opening of a wall of a vehicle, the fixing device includes a support element with at least one support lug; and a retaining element with at least one retaining arm for fixing the fixing device to the wall, the retaining element being arranged in a rotatable manner through the support element for fixing the fixing device relative to the support element and the support lug being configured to block a rotation of the support element.

The invention further provides a method for fixing a fixing device for fixing an element in an opening of a wall of a vehicle, the fixing device comprising a support element with at least one support lug and a retaining element with at least one retaining arm for fixing the fixing device to the wall, the retaining element being arranged in a rotatable manner through the support element for fixing the fixing device relative to the support element, and the support lug being configured to block a rotation of the support element. The method includes inserting the support lug and the retaining element into the opening in the wall; and rotating the retaining arm relative to the support element, in order to lock the fixing device to the wall, the support lug blocking a rotation of the support element.

The present invention is based on the recognition that a simple, and at the same time secure, possibility of fixing an element to a wall is available by providing a possibility of fixing using retaining arms which are twisted when fixed to a rear face of the wall, to which the fixing device is intended to be fixed. Before the fixing, the retaining arms are rotated into a position in which they may be inserted through a hole of elongate configuration (an opening) in the wall, whereupon the retaining arms are twisted on the rear face of the wall. So that during the fixing process the fixing device may not be twisted relative to the wall, a support lug may be provided on a support element (fixed to the wall in the fixed state) which, for example, engages in the opening. On the support element or the retaining element, further elements, such as for example a sensor, may be fixed, said sensor being intended to be retained in a precisely predefined position. As the locking is designed in the manner of a bayonet closure, the attachment according to the invention does not require further elements such as screws for fixing the fixing device. At the same time, by pressing and twisting the retaining element a possibility may be provided for fixing elements to the wall very rapidly.

The attachment according to the invention offers the advantage that the fixing device is designed to be very simple structurally. Moreover, the required components may be produced by simple production methods, such as for example a plastic injection-molding method, so that cost-effective production is also possible. At the same time, the attachment according to the invention ensures that the fixing device (and an element possibly fixed thereto), during or after the fixing process, may be retained securely in a predefined position so that subsequent slipping from the aligned position is almost excluded.

In a preferred embodiment of the invention, the retaining element has a plurality of retaining arms. This provides the advantage that, on the one hand, a uniform distribution of the retaining force is applied to the rear face of the wall during fixing and thus the probability of the fixing device slipping is further reduced. On the other hand, the provision of at least two retaining arms also ensures the stability of the retaining element, so that in the event of damage to one of the retaining arms there is no risk of impairment to the functionality.

Also, the at least one retaining arm may have a plurality of regions of variable thickness. This offers the advantage that, on the one hand, fixing to walls of variable wall thickness is possible and, on the other hand, variable contact force may also be exerted onto the wall.

In a further embodiment of the invention, the at least one retaining arm may have a chamfer in the thickness profile. This offers an advantage when tightening the retaining arm, as said retaining arm is secured by the chamfer itself, and pulls the fixing device against the wall and fixes the fixing device there.

In order to ensure a seal of the opening against dirt or liquids, the fixing device may further comprise a sealing element which is configured to seal the opening in the wall in a fluid-tight manner.

According to a further embodiment, the at least one retaining arm may have a width which is configured to index an orientation of the fixing device when identifying the position of the retaining arm. This offers the advantage that the position and/or alignment of the fixing device during mounting is possible in a simple manner by identifying the characteristic retaining arm, so that an additional indexing or marking of this position may be dispensed with.

According to a further embodiment of the invention, the support lug is configured to provide an aid when inserted into the opening, the support lug extending from the support element over an outer edge of the retaining arm. This provides protection of the retaining arm against damage when inserting into the opening and additionally makes the insertion of the fixing device into the opening easier for a fitter when the view of the opening is concealed.

In a further embodiment of the invention, the support element or the retaining element may also have a mechanical unit, which is configured to signal to a user the twisting of the retaining element relative to the support element by a predetermined angle. This offers the advantage that it may be indicated to a fitter by simple structural elements when fixing the fixing device that the retaining arm has been rotated into a position in which a more secure hold is ensured.

In a further embodiment of the invention, the support element and/or the retaining element may also have a protective element which is configured in a position of the retaining arm in the unfixed state to block the possibility of a plug connection for the contact of a sensor and, when twisting the retaining arm by a predetermined angle relative to the aforementioned position of the retaining arm, to enable the possibility of a plug connection for the contact of the sensor. This provides the possibility of informing a fitter of the fixing device that the fixing device has not yet been correctly installed. If the positioning of the plug connection for the contact of the sensor is thus prevented from being enabled, a subsequent alignment of the fixing device has to take place before further operating processes so that the secure fixing may be ensured.

The support element and/or the retaining element may also have at least one locking unit which is configured to hold the retaining element in this predetermined position after reaching a predetermined position. In this manner, the fixing device may advantageously be prevented from rotating again out of the desired position which has been reached and thus a secure fixing may once again be prevented from slipping.

A sensor element may also be provided with a fixing device as has been disclosed in the above embodiments. This offers the advantage that in such a configuration a particularly secure position and alignment of the sensor element may be ensured and thus the functionality of the sensor element is ensured in the best possible manner.

BRIEF DESCRIPTION OF THE DRAWINGS

The invention is described in more detail hereinafter by way of example with reference to the accompanying drawings, in which:

FIGS. 1A and 1B show two views of hole patterns of openings in the wall in which the fixing device may be inserted and fixed;

FIG. 2 shows a perspective view of an exemplary embodiment of the present invention;

FIGS. 5A, 5B, and 5C show views of an exemplary embodiment of the present invention from different perspectives;

FIGS. 6A, 6B, and 6C show views of the exemplary embodiment of the present invention shown in FIGS. 5A, 5B, and 5C, the dimensioning having been provided for a possible implementation of the exemplary embodiment;

FIG. 7 shows a representation of a cross-sectional view of the exemplary embodiment shown in FIG. 5 or FIG. 6;

FIGS. 8A, 8B, and 8C show perspective views of exemplary embodiments of the invention, the blocking elements preventing twisting of the fixing device after reaching the predefined position;

FIGS. 9A, 9B, and 9C show perspective views of exemplary embodiments of the invention, which ensure installation aids for rapid and secure installation of the fixing device according to the invention in the opening in the wall; and FIG. 10 shows a flow diagram of an exemplary embodiment of the invention as a method.

Figure 3:
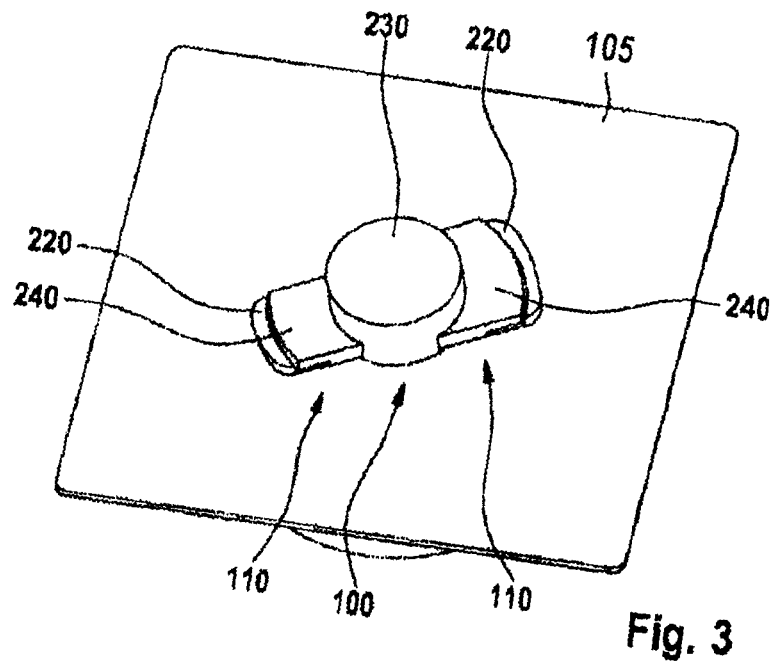
FIG. 3 shows a perspective view of the exemplary embodiment according to FIG. 2 of the present invention when fitted in a support.

Dimensions and sizes which may have been provided are only given by way of example, so that the invention is not limited to these dimensions and sizes. The same or similar elements are provided with the same or similar reference numerals. The figures of the drawings, the description thereof and the claims also contain many features in combination. It is clear to a person skilled in the art that these features may also be considered individually or they may be combined to form further combinations not specifically described here.

DETAILED DESCRIPTION

It is the object of the invention, in particular, to design the layout of a sensor and/or a fixing device so that the mounting of the fixing device which may carry a sensor is possible without additional fixing means. At the same time, the mounting is intended to be simple and secure in order to prevent and/or make difficult faulty mechanical installation as far as possible. Furthermore, it is an object of the invention to design the fixing device and/or a sensor, so that it may be used universally and, for example, may be mounted on door supports of variable material thickness.

The invention is further described in detail using the example of an airbag pressure sensor. The invention may be transferred, however, to other types of sensor and applications. The airbag pressure sensor is designed so that in use the sensor is installed in the side doors of the vehicles, in order to detect the deformation of the doors in the event of a side impact.

The invention is based substantially on the use and/or development of the concept of a bayonet fixing for sensors. The fixing takes place, in particular, by means of a rotational movement of the fixing device (and/or of the sensor) or a part fixed to the fixing device (and/or to the sensor) relative to the door support or relative to a further support and/or a wall with a corresponding geometry. In the support and/or the wall, only one hole pattern should be provided which permits a "bayonet fixing" and if a sealing function of the sensor is desired relative to the support, a sufficiently planar, defined surface is provided around the fixing hole.

The fixing device and/or the sensor thus consists, for example, of two components which are rotatable relative to one another, one component being rotated during mounting relative to the support, the other component however being securely fixed in the support and correspondingly not rotated during mounting.

The advantages of the attachment according to the invention may be summarized as follows:

The mounting of the sensor is possible without additional fixing means. The mounting of the sensor may be possible in a simple manner on supports and/or walls of different thicknesses. Devices may be attached to the sensor which permit easy threading-through into the hole pattern and simple and secure mounting. These are mechanical threading aids (chamfers), mechanical indexing for precise installation (protection against twisted installation), mechanical fixing and locking as well as devices which permit the monitoring of the installation process by optical, haptic and/or acoustic communication to the operator. The mounting of the sensor takes place, for example, by means of a bayonet closure-type locking element; as a result, the retaining force is applied via an inflexible and robust mechanical device. The sensor may be designed so that the contact of the plug is only possible if the sensor has been correctly mounted in the support with a sufficient angle of rotation. Provided the rotational movement has not been fully completed, the plug is mechanically locked. At the same time, it is possible to design the layout so that when the mating plug is positioned on the sensor, it is not possible to rotate the sensor out of the support as it is mechanically locked. A non-rotating lock may be attached to the sensor in a single or multiple embodiment which does not permit the two components of the sensor to rotate counter to one another, provided the sensor is not pressed onto the support. Thus a faulty installation and/or a release of the plug by twisting the sensor components in any position is made difficult and/or avoided.

The essential advantage of the invention is that such a fixing device and/or a sensor thus designed may be mounted securely and simply without additional aids.

The operating principle is shown in more detail by way of example in the accompanying sketches and drawings of the figures.

FIGS. 1A and 1B firstly show two views of hole patterns of openings in a support and/or a wall, the fixing device according to the invention being able to be inserted into these holes 100 of the wall 105. The holes 100 are such that they have sides regions 110 of different widths around the actual central hole 100, through which side regions the retaining arms of the fixing device may be guided. The side regions 110 are thus of variable width, so that by means of the width of the retaining arm an indexing of the position of the fixing device is possible when inserting into the hole 100 in the wall 105.

In FIG. 2, an exemplary embodiment of the present invention is shown as a perspective view. The fixing device 200 which, for example, may itself be a support holder of a sensor or the sensor itself, comprises a support element 210 for supporting on the support or the wall, the support element comprising a support lug 220. The fixing device 200 further comprises a retaining element 230 with retaining arms 240. The retaining element 230 is rotatably arranged relative to the support element 210, so that a rotational axis of the retaining element 230 passes through the support element 210.

In this exemplary embodiment the support lugs 220 are provided as threading aids for mounting the fixing device 200 in the openings 100 in the wall 105, so that they cover an outermost region of the retaining arms 240 and thus not only protect said retaining arms during insertion into the opening but also provides guidance during mounting, when the opening in the wall is concealed, for example by the support element 210. Also the support lug 220 and/or the two support lugs 220 may be of variable width, similar to the two retaining arms 240, so that the indexing of the position of the fixing device 200 is also possible by means of the support lug 220.

The retaining arms 240 may thus be designed according to the different widths of the side regions 110 of the holes 100, in order to ensure indexing of the position or alignment of the fixing device during installation. From FIG. 2 it is also visible that the retaining arms 240 have different partial regions, of variable thickness, in order to be able to engage easily in walls of different wall thicknesses without different fixing devices possibly being required therefor. Also in FIG. 2, a sealing element 250 is visible which is arranged in an annular manner about an edge of the support element 210, and may seal the opening and/or the hole 100 in a fluid-tight manner against liquids or gases. Moreover, in FIG. 2 a protective element 260 is also visible, which may be fixed to the support element 210 and/or to the retaining element 230 (not visible in the view of FIG. 2). The protective element 260 is designed so that a plug connection 270 is enabled when the retaining element is twisted relative to the support element 210, whereby the possibility of a plug connection for a sensor attached to the fixing device is only possible after correct twisting and thus locking of the retaining element 230. As illustrated in FIGS. 2, 4, 5, and 7, in some constructions the protective element 260 includes a lip 261 that extends alongside the plug connection 270.

In order to be able to compensate for tolerances in the support/wall thicknesses and unevenness, two compensation mechanisms may be used. Firstly, the bayonet and/or retaining arm 240 may be of a multi-stepped design, as already shown in FIG. 2. In connection with a correspondingly adapted internal radius 100 of the hole pattern, the contact of the fixing device 200 and/or of the sensor or the possible wall thickness (support thickness) may thus be varied. This is visible from FIG. 1 and FIG. 7 described below. Secondly, the seal 250 or a compressible compensating element may be inserted between the fixing device/sensor 200 and wall/support 105 which with smaller variations in the support thickness or unevenness in the support permits compensation to a limited extent.

In FIG. 3 the installation of an exemplary embodiment of the present invention is shown. In this case, the support lugs 220, which are designed in the present example as insertion aids and/or threading aids, are inserted together with the retaining arms 240 of the retaining element 230 into the hole 100 and/or the side regions 110 in the wall 105. In FIG. 3, the state after insertion from the rear face of the wall 105 is shown.

Figure 4:
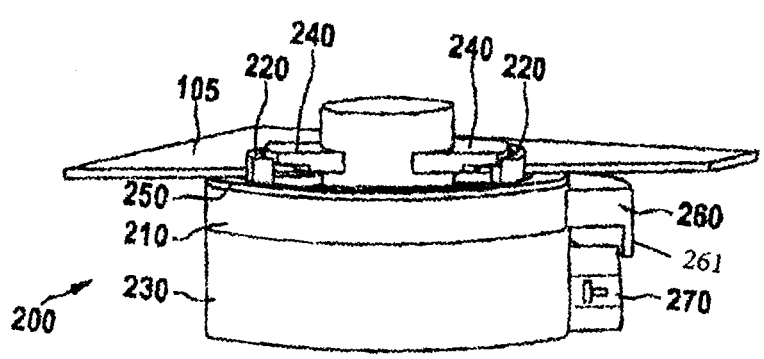
FIG. 4 shows a further perspective view of the exemplary embodiment shown in FIG. 3 of the present invention, a detail being reproduced in sectional view.

In FIG. 4 a side view of the fixing device after the introduction and/or insertion of the retaining element 230 and the support lug 220 into the opening 100 of the wall 105 is visible. In this case, the arrangement of the protective element on the support element 210 is also visible, so that when twisting the retaining element 230 the protective element 260 permits the possibility of the plug connection 270. Alternatively, the support element 210 may also be twisted relative to the retaining element 230; it only has to be ensured that retaining arms 240 on the rear face of the wall 105 are twisted and a locking of the fixing device 200 in the wall 105 results.

In FIGS. 5A, 5B, and 5C, such an enabling of the possibility of the plug connection 270 with an external plug 500 is shown, in FIGS. 5A and 5B the arrangement being shown before the fixing in the wall and/or before the twisting of the retaining element 230 relative to the support element 210 in side view (lower view) and plan view (upper view) and in FIG. 5C an arrangement being shown after correctly twisting the retaining element 210 relative to the support element 230. Thus it is also visible that the possibility of the plug connection 270 is only enabled after rotating about a predetermined angle, as only after twisting about this predetermined angle does the protective element 260 permit the possibility of the plug connection 270 for positioning a plug 500.

FIGS. 6A, 6B, and 6C show a practical embodiment with the dimensioning of the fixing device and/or a sensor, as is shown in FIGS. 5A, 5B, and 5C.

FIG. 7 shows a schematic cross-sectional view of the fixing device according to the exemplary embodiment, as is also shown in FIGS. 2 to 6.

FIG. 8A, 8B, and 8C show possible blocking elements 800 in the fixing device 200 in different enlarged perspective views. The blocking element 800 shown in each case is provided to avoid a twisting of the fixing device 200 relative to the plug locking 260 without correct installation. The blocking element 800 may thus be configured such that it is engaged when reaching the predefined end position when twisting the support element 210 or the retaining element 210 and thus activates a locking function, which prevents turning back the retaining element 230 or the support element 210.

In FIGS. 9A, 9B and 9C in different perspective views possible installation aids are shown graphically which, for example, show guides or latching 900 on a defined end stop 910.

In FIG. 10 a flow diagram of an exemplary embodiment of the present invention is shown further as a method. The method 1000 is provided for fastening a fixing device 200 for fixing an element in an opening 100 of a wall 105, the fixing device 200 comprising a support element 210 with at least one support lug 220 and a retaining element 230 with at least one retaining arm 240 for fixing the fixing device to the wall, the retaining element 230 being arranged in a rotatable manner through the support element 210 for fixing the fixing device 200 relative to the support element 210, and the support lug 220 being configured to block a rotation of the support element 210 in the wall 105. The method 1000 comprises a first step of insertion 1010 of the support lug and of the retaining element in the opening in the wall and a second step 1020 of rotation of the retaining arm relative to the support element in order to lock the fixing device to the wall, the support lug blocking a rotation of the support element.

In summary it may be noted that a sensor and/or a fixing device for a sensor, as already indicated above, may consist of two or more parts which may be rotated relative to one another. In the example set forth, the sensor is designed so that the sensor 200 is provided with a so-called sealing plate 250 which, for example, may be simply positioned on the sensor 200 (see also FIGS. 5 and 8). The sealing plate 250 may have a fixing crown, which in the delivery state of the sensor 200 is adjacent to the bayonet arms 240 fixed to the sensor (see FIGS. 2, 3, 4, 8 and 9). When threading through into the hole 100, the fixing crown and the bayonet arms 240 are positioned in the support 105 through the hole 100 and/or 110. Then the sensor which, for example, is fixed to the retaining element 230, is rotated relative to the sealing plate 250 (which, for example, is arranged on the support element 210) as well as the support 105 by a specific angle. The sealing plate 250 thus remains, due to the fixing crown, securely fixed in the support 105 and does not twist. In this case, the fixing crown forms the support lug 220. This permits the use of flexible seals or compressible compensating elements and avoids during installation shear forces acting on the flexible structures which are possibly not very robust. When twisting the sensor, the bayonet arms 240 rotate over the support material around the internal radius and thus locks the sensor in the support. By means of chamfers, the arms 240 may thus be designed so that they are pulled against the support when fixing the sensor, which is thus fixed more securely. In the example set forth, when fixing the sealing plate, the bayonet on the sensor is clamped between the support and sensor.

Threading aids/chamfers are attached to the fixing crown and/or to the support element 210, said threading aids/chamfers permitting the mounting of the sensor without the bayonet fixing or the hole being visible in the support (this may be concealed visually by the sensor). By mechanical devices, (for example a ball track or the like) it may be avoided that the sensor is able to be twisted in the incorrect direction. Moreover, the overtwisting of the sensor may be avoided via a similar device or the same device. In each case, the fixing crown may serve as an anchor relative to the support and/or the wall 105.

In order to simplify the installation of the sensor further and to allow it to be monitored, mechanical devices may be present on the sensor which inform the operator in an optical, haptic and/or acoustic manner whether and/or that the sensor has been correctly twisted into the final position. Possibly, clip devices may also be produced so that repeated mounting of the sensor is possible.

On the sensor and/or on the sealing ring a mechanical plug lock may be provided which prevents the mating plug from being able to be attached to the sensor, provided the sensor has not been sufficiently twisted relative to the support and/or provided the sensor is not in the final position (see also FIGS. 5 and 7).

This device may be further designed so that the sensor may only be released from the support when the counter plug 500 has been removed. The counter plug 500 and the electrical contact thus gain a possible monitoring function: whether the electrical contact is present, the sensor has been mounted and/or the sensor has not been dismantled.

In order to prevent mistreatment as far as possible, in the sensor a lock may be attached to prevent twisting of the sensor relative to the plug lock/sealing plate. This may be implemented by a simple locking hook 800 as is shown in FIG. 8. The locking hook 800 prevents a rotation of the sensor relative to the sealing plate and vice-versa. Only when the locking hook is released by contact and/or by pressing the sensor against the support is a rotation of the sensor relative to the sealing plate and/or the plug lock and thus the unlocking of the plug lock possible. When a plurality of said locking hooks are produced, deliberate mistreatment is made more difficult. It is an object of the invention to permit the rotation of the sensor and the unlocking of the plug only in the target position in the support and/or to make different ways of mounting or unlocking the plug as difficult as possible.

What is claimed is:

1. A fixing device (200) for fixing in an opening (100) of a wall of a vehicle, the fixing device (200) comprising the following features:
   a support element (210) with at least one support lug (220) and an insertion opening extending through the support element (210); and
   a retaining element (230) with at least one retaining arm (240) for fixing the fixing device (200) to the wall by rotation of the retaining element (230) relative to the support element (210) about an axis, wherein at least a portion of the retaining element (230) extends entirely through the insertion opening along the axis, such that a first portion of the retaining element (230) is disposed axially outside the insertion opening on a first side of the insertion opening and a second portion of the retaining element (230) is disposed axially outside the insertion opening on a second, opposite side of the insertion opening, the first portion including the at least one retaining arm (240), and the support lug (220) being configured to block a rotation of the support element (210) within the opening of the wall;
   wherein the support lug (220) provides a support for inserting into the opening (100) of the wall, wherein the support lug (220) protects the retaining arm (240), and wherein the support lug (220) extends axially over a radially outer edge of the retaining arm (240).

2. The fixing device (200) as claimed in claim 1, characterized in that the retaining element (230) has a plurality of retaining arms (240).

3. The fixing device (200) as claimed in claim 1, characterized in that the at least one retaining arm (240) has a chamfer in a thickness profile.

4. The fixing device (200) as claimed in claim 1, characterized in that the fixing device (200) further comprises a sealing element (250) which is configured to seal the opening (100) in the wall (105) in a fluid-tight manner.

5. The fixing device (200) as claimed in claim 1, characterized in that the at least one retaining arm (240) has a width which is configured to index an orientation of the fixing device (200) when identifying a position of the retaining arm (240).

6. The fixing device (200) as claimed in claim 1, characterized in that one of the support element (210) and the retaining element (230) has a mechanical unit, which is configured to signal to a user a twisting of the retaining element (230) relative to the support element (210) by a specific angle.

7. The fixing device (200) as claimed in claim 1, wherein the fixing device is part of an overall sensor assembly.

8. The fixing device (200) as claimed in claim 1, wherein the support element (210) is a first sensor housing and the retaining element (230) is a second sensor housing.

9. The fixing device (200) of claim 1, wherein the fixing device (200) itself is a sensor.

10. The fixing device (200) of claim 1, wherein the retaining element (230) includes a shaft that extends through the insertion opening.

11. A fixing device (200) for fixing in an opening (100) of a wall of a vehicle, the fixing device (200) comprising the following features:
   a first sensor housing (210) with at least one support lug (220); and
   a second sensor housing (230) with at least one retaining arm (240) for fixing the fixing device (200) to the wall, the retaining element (230) being arranged in a rotatable manner through the first sensor housing (210) about an axis of rotation for fixing the fixing device (200) relative to the first sensor housing (210), and the support lug (220) being configured to block a rotation of the first sensor housing (210) within the wall;
   characterized in that at least one of the first sensor housing (210) and the second sensor housing (230) includes an outer surface having an electrical plug connection (270) disposed thereon and configured for contact with another component, and that at least one of the first sensor housing (210) and the second sensor housing (230) has a protective element (260) which is configured in a position of the retaining arm (240) in an unfixed state to block the plug connection (270), and when twisting the retaining arm (240) by a predetermined angle relative to the aforementioned position of the retaining arm (240), to unblock the plug connection (270) so as to allow the contact with the other component.

12. The fixing device (200) as claimed in claim 11, characterized in that at least one of the first sensor housing (210) and the second sensor housing (230) has at least one locking unit (800) which is configured to hold the second sensor housing (230).

13. A sensor assembly comprising the fixing device (200) as claimed in claim 11 wherein the sensor assembly further comprises a sensor releasably coupled to the fixing device via the plug connection (270).

14. The fixing device (200) as claimed in claim 11 wherein the support lug (220) provides a support for inserting into the opening (100), wherein the support lug (220) protects the retaining arm (240), and wherein the support lug (220) extends axially over a radially outer edge of the retaining arm (240).

15. The fixing device (200) as claimed in claim 11, wherein the first sensor housing (210) includes an insertion opening, and wherein at least a portion of the second sensor housing (230) extends entirely through the insertion opening along the axis of rotation, such that a first portion of the second sensor housing (230) is disposed axially outside the insertion opening on a first side of the insertion opening and a second portion of the second sensor housing (230) is disposed axially outside the insertion opening on a second, opposite side of the insertion opening, the first portion including the at least one retaining arm (240).

16. The fixing device (200) as claimed in claim 15, wherein the second sensor housing (230) includes a shaft that extends through an insertion opening in the first sensor housing (210).

17. The fixing device (200) as claimed in claim 11 wherein the outer surface is annular.

18. The fixing device (200) as claimed in claim 11 wherein in the unfixed state, the fixing device (200) is not coupled to a wall.

19. The fixing device (200) as claimed in claim 11 wherein the protective element (260) includes a lip (261) that extends over and blocks the plug connection (270).

20. A method (1000) for fixing a fixing device (200) for fixing an element in an opening (100) of a wall of a vehicle, the fixing device (200) comprising a support element (210) with at least one support lug (220) and a retaining element (230) with at least one retaining arm (240) for fixing the fixing device (200) to the wall, the retaining element (230) being arranged in a rotatable manner through the support element (210) for fixing the fixing device (200) relative to the support element (210), and the at least one support lug (220) being configured to block a rotation of the support element (210), the method comprising:
   inserting (1010) both the at least one support lug (220) and the at least one retaining arm (240) through the opening (100) in the wall (105) along a same direction; and
   rotating (1020) the at least one retaining arm (240) relative to the support element (210), in order to lock the fixing device (200) to the wall (105), the at least one support lug (220) blocking a rotation of the support element (210) within the opening,
   wherein the support lug (220) provides a support for inserting into the opening (100), wherein the support lug (220) protects the retaining arm (240), and wherein after the step of inserting the support lug (220) extends axially over a radially outer edge of the retaining arm (240).

21. The method of claim 20 wherein the fixing device (200) is part of an overall sensor assembly.

22. The method of claim 20 wherein the support element (210) is a first sensor housing and the retaining element (230) is a second sensor housing.

23. The method of claim 20 wherein the fixing device (200) itself is a sensor.

24. The method of claim 20 further comprising inserting a shaft of the retaining element (230) through an insertion opening in the support element (210).

* * * * *